March 11, 1969     L. M. HARPHAM     3,431,670
COMBINATION FISHING POLE AND REEL HOLDER
Filed Sept. 9, 1966
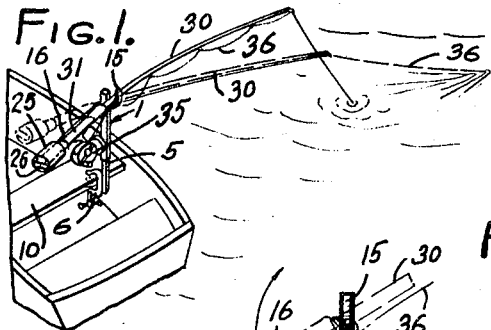
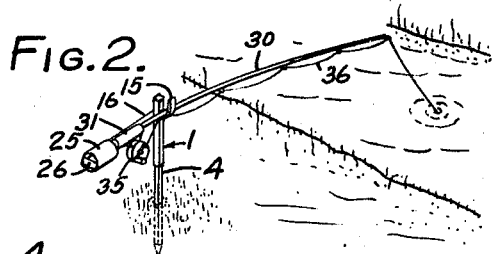
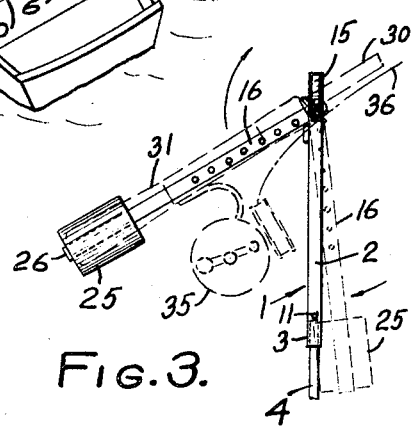
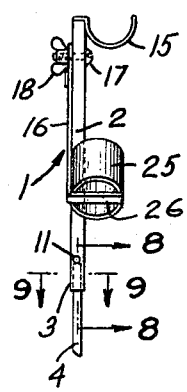
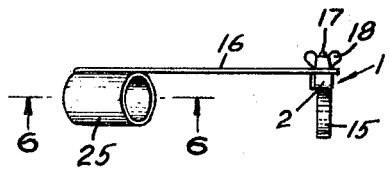
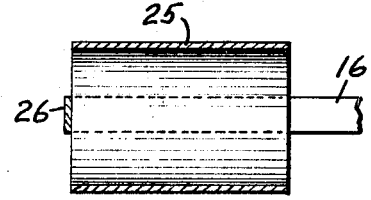
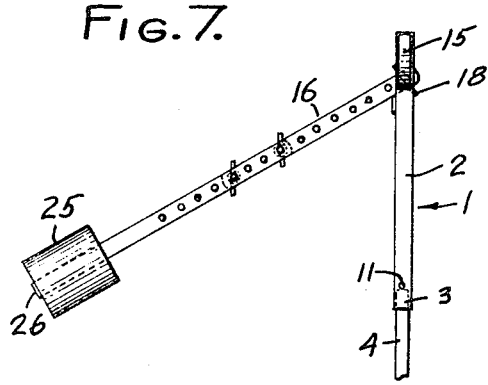
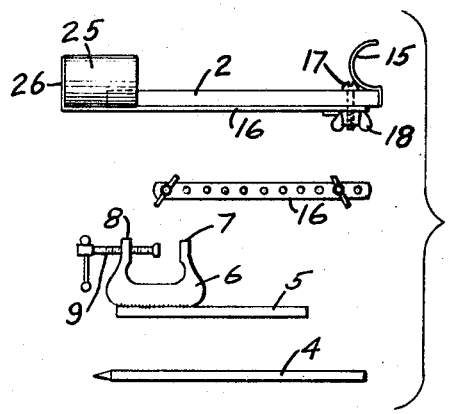
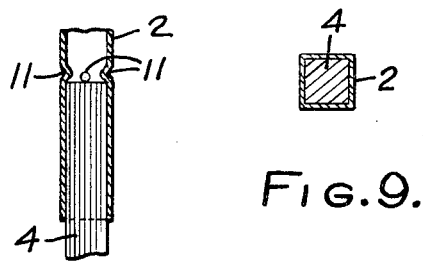
INVENTOR,
LAWRENCE M. HARPHAM;
BY
Calvin Brown
ATTORNEY United States Patent Office 3,431,670
Patented Mar. 11, 1969

3,431,670
COMBINATION FISHING POLE AND
REEL HOLDER
Lawrence M. Harpham, 9014 E. Fairview Ave.,
San Gabriel, Calif. 91776
Filed Sept. 9, 1966, Ser. No. 578,315
U.S. Cl. 43—21.2      1 Claim
Int. Cl. A01k 97/10

ABSTRACT OF THE DISCLOSURE

The fishing pole and reel holder includes a support post adapted to be mounted vertically on a supporting object such as a boat seat or in the ground and which support post is provided with a laterally offset U-shaped fulcrum member at one end. A lever is pivoted at one end to the support post adjacent the fulcrum member while the opposite end of the lever is provided with a laterally offset socket member in alignment with the fulcrum member. The fishing pole has its butt end received in the socket member and a remaining length carried in the fulcrum member with the reel positioned between the fulcrum member and the socket.

---

The present invention relates to a combination fishing pole and reel holder adapted for use on either land or boat.

An object of the invention is to provide a suitable holder for a fishing pole wherein the fisherman does not have to hold the pole but the pole is suitably held by the invention without fear of pole loss in the case a fish is caught and runs with the bait.

A further object is the provision of a fishing pole holder, which when a fish is caught will assure that the hook will penetrate the fish's mouth.

A further object is the provison of a fishing pole and reel holder which is held by the invention in such a position that the fishing pole will not be lost therefrom when a fish grabs the fish hook and wherein the holder is capable of tipping action to allow the fishing pole and line to follow the fish in its movement and then be tipped backwardly under gravity to insure positive impaling of the hook in the fish's mouth.

A further object is the provision of a holder for fishing poles which may be readily collapsed so as to occupy small space.

Other objects include a fishing pole and reel holder of attractive appearance, inexpensive in cost of manufacture, and generally superior to devices now known to the inventor for holding a fishing pole.

In the drawings:

FIGURE 1 is a fragmentary perspective view of the invention mounted to the seat of a boat;

FIGURE 2 is a fragmentary perspective view of the invention used on land;

FIGURE 3 is a fragmentary side elevation of the invention;

FIGURE 4 is a fragmentary rear elevation of the invention;

FIGURE 5 is a top plan view of the invention;

FIGURE 6 is a fragmentary sectional view on the line 6—6 of FIGURE 5, and on an enlarged scale;

FIGURE 7 is a fragmentary side elevation showing extension of a member of the invention;

FIGURE 8 is a fragmentary partially sectional view on an enlarged scale, taken on the line 8—8 of FIGURE 4;

FIGURE 9 is a cross sectional view on an enlarged scale on the line 9—9 of FIGURE 4; and, FIGURE 10 is a detached side view of members used in the practice of the invention.

Referring now to the drawing, the fishing pole and reel holder is particularly adaptable for all fresh water fishing. Fresh water fish include catfish, bluegill, trout, crappie, whitefish, sunfish, and other fish. Lake fish are usually caught either by the angler being in a boat or on the shoreline of the lake or stream and the present invention is adaptable to either boat or land use.

The invention is designated as an entirety by 1 and comprises a support post 2 usually mounted vertically either to a boat seat or in the ground, as shown in FIGURES 1 and 2. Thus the post is socketed at its lower end 3 to receive a pointed rod or spike 4 or to receive a rod 5 carrying a clamp 6. The clamp 6 is formed with a pair of fixed jaws 7 and 8, the jaw 8 carrying a screw threaded bolt 9 which is turnable whereby the end of the bolt holds a supporting object such as seat 10 against the jaw 7 as shown in FIGURE 1. In the case of land use, the spike 4 has an end received within the socket 3 so that spike may impale the land and support the post 2. It will be observed that both the spike 4 and the rod 5 are socketed in the end of the support post and that both the spike and rod as well as the socket portion of the post are of square section as shown in FIGURES 8 and 9. The lower end of the support post is swaged inwardly as shown in FIGURE 8 at 11 to limit inward movement of the post or spike and, likewise, to assure that there will be no turning movement of the post when the post is secured by the clamp to the boat seat as shown at 10. The post 2 carries a U-shaped member constituting a fulcrum member 15. Secured to the support post 2 at the side thereof opposite the fulcrum member 15 is a lever 16. This lever is provided adjacent one end thereof with a transverse opening as is likewise the support post to receive a bolt 17 carrying a wing nut 18 whereby the lever may be rocked or swung vertically. The lever 16 may be in two sections as shown in FIGURE 7 to allow extension of lever length and in this particular both sections are provided with transverse spaced apart bores through which bolts are passed to secure the levers in adjusted position, the bolts carrying wing nuts as shown. Whether two lever sections or a single lever section is used, the end of the lever opposite its point of pivoting with the support post carries in alignment with the fulcrum member 15, a socket member 25. The socket member comprises a short length tube open at both ends but provided with a diametric cross piece 26 formed by bending an end of a lever section 16 at right angles to its general length, as shown in FIGURE 4.

The fishing pole or rod 30 is of usual form and the butt end 31 is received within the socket member 25 and engages the crosspiece 26 which limits outward movement of the pole therefrom. The pole rests between the socket member and the fulcrum member 15 which latter members are in alignment, and the pole 30 carries a line reel 35 adapted to be positioned between the socket member 25 and the fulcrum member 15. The reel carries a fishline 36 usually passed through eyelets carried by the pole or rod 30 and extends from the tip of the pole, the line carrying the usual hook.

The operation, uses and advantages of the invention are as follows.

Assuming use of the invention in a boat such as shown in FIGURE 1, after a cast of the line has been made, the pole will assume the position shown in the solid lines of FIGURE 1. If a fish grasps the hook with its bait, the fish will usually run and in so doing the fishing pole or rod will assume the position shown by dotted lines in FIGURE 1 wherein the pole is tipped about the fixed fulcrum member 15 to turn the lever 16 on its pivot point and, likewise, raise the socket member 25. As the reel 35 is positioned between the fulcrum member and the socket member if the pole is moved by the fish the reel will strike the support post 2 and prevent the pole or rod from being dislodged from the holder 1 as the socket member 25 is of such length as to hold the butt end of the pole or rod within the socket when the reel strikes the support post 2. A relaxing of the line allows the butt end of the pole by gravity to rock under weight of the socket member 25 to move the lever 16 downwardly and such movement pulls on the line 36 and assures that the fish hook will penetrate the mouth of the fish thus assuring a catch.

In the use of the invention on shore as depicted in FIGURE 2, the support post is constructed so as to allow release of the clamp and the insertion of the spike within the support post. Thus the angler does not hold the fishing pole or rod whether in a boat or on land. Therefore, the invention provides a dual purpose without the use of complicated devices as only a spike or a clamp for the support post is employed.

I claim:
1. A fishing pole and reel holder, comprising: a support post provided with a laterally offset U-shaped fulcrum member, means for securing the support post to a foundation member, an adjustable length lever arm pivotally secured at one end thereof to the upper end of the support post and a laterally offset tubular socket member in alignment with the offset U-shaped fulcrum member carried by the outer end of said adjustable lever; the fishing pole having its butt end received in the tubular socket member and a portion carried in the fulcrum member, the fishing pole reel being mounted on the underside of the fishing pole and interpositioned between the socket member and the fulcrum member, the length of said tubular socket member and the adjusted length of said lever arm being such that when outward sliding movement of the fishing pole occurs incident to a fish grabbing the fish bait, the butt end of the fishing pole is retained in the socket member and the reel will engage the support post to prevent loss of the fishing pole from the holder and to allow tipping of the socket member and lever downward under gravity.

References Cited

UNITED STATES PATENTS

| | | | |
|---|---|---|---|
| 1,091,491 | 3/1914 | Ebur | 248—38 |
| 2,642,690 | 6/1953 | Soenksen | 43—15 |
| 3,037,314 | 6/1962 | Hardy | 43—21.2 X |
| 3,309,808 | 3/1967 | George | 43—15 |

FOREIGN PATENTS

| | | |
|---|---|---|
| 905,175 | 9/1962 | Great Britain. |
| 570,606 | 12/1957 | Italy. |

WARNER H. CAMP, *Primary Examiner.*